United States Patent
Leung et al.

(10) Patent No.: US 9,390,503 B2
(45) Date of Patent: *Jul. 12, 2016

(54) BROADBAND PASSIVE TRACKING FOR AUGMENTED REALITY

(71) Applicant: Empire Technology Development LLC, Wilmington, DE (US)

(72) Inventors: Henry Leung, Alberta (CA); Xiaoxiang Liu, Alberta (CA)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 290 days.

This patent is subject to a terminal disclaimer.

(21) Appl. No.: 14/094,623

(22) Filed: Dec. 2, 2013

(65) Prior Publication Data
US 2014/0085483 A1     Mar. 27, 2014

Related U.S. Application Data (63) Continuation of application No. 12/719,797, filed on Mar. 8, 2010, now Pat. No. 8,610,771.

(51) Int. Cl.
*G06T 7/00* (2006.01)
*H04N 5/225* (2006.01)
(Continued)

(52) U.S. Cl.
CPC .............. *G06T 7/0042* (2013.01); *G06T 7/2033* (2013.01); *G06T 19/006* (2013.01); *H04N 5/225* (2013.01); *H04N 7/18* (2013.01)

(58) Field of Classification Search
CPC ... G06T 19/006; G06T 7/0042; G06T 7/2033; H04N 5/225; H04N 7/18
See application file for complete search history.

(56) References Cited

U.S. PATENT DOCUMENTS

| 4,137,532 A | 1/1979 | Taylor, Jr. et al. |
| 5,347,541 A | 9/1994 | Iltis et al. |

(Continued)

FOREIGN PATENT DOCUMENTS

| JP | 2002181925 A | 6/2002 |
| JP | 2003256876 A | 9/2003 |

(Continued)

OTHER PUBLICATIONS

Ching-Wel, W.C. "System Level Investigations of Television Based Bistatic Radar" Cape Town, Dec. 2005. Whole document, esp. figures 1.1, 2.1 and 2.2 1-28 Abstract, pp. 1, 7, 8, 27 and 47 1-28.
(Continued)

*Primary Examiner* — Mohammed Rahaman
(74) *Attorney, Agent, or Firm* — Turk IP Law, LLC (57) ABSTRACT

Technologies are generally described for a broadband passive sensing and tracking system that may employ a number of passive receivers that each have the capability of sensing electromagnetic waves (e.g., Radio Frequency "RF" signals) from surrounding broadcast sources. Each passive receiver may be adapted to sense through one or more antennas. Multiple receivers at different positions may be utilized to form a broadband sensing network adapted to perform collaborative tracking of a scene of interest. According to some examples, a beam-forming algorithm may be applied over the broadband sensing network utilizing an antenna array formed by the passive receivers to localize and track objects.

16 Claims, 8 Drawing Sheets

(51) Int. Cl.
  *H04N 7/18* (2006.01)
  *G06T 7/20* (2006.01)
  *G06T 19/00* (2011.01)

(56) References Cited

U.S. PATENT DOCUMENTS

| | | | |
|---|---|---|---|
| 5,828,944 | A | 10/1998 | Uppaluri et al. |
| 6,500,008 | B1 | 12/2002 | Ebersole et al. |
| 6,578,017 | B1 | 6/2003 | Ebersole et al. |
| 6,594,616 | B2 | 7/2003 | Zhang et al. |
| 6,607,038 | B2 | 8/2003 | Ebersole, Jr. et al. |
| 6,760,026 | B2 | 7/2004 | Li et al. |
| 6,809,743 | B2 | 10/2004 | Ebersole et al. |
| 6,809,744 | B2 | 10/2004 | Ebersole et al. |
| 6,822,648 | B2 | 11/2004 | Furlong et al. |
| 6,866,512 | B2 | 3/2005 | Ebersole, Jr. et al. |
| 6,901,389 | B1 | 5/2005 | Madison et al. |
| 6,903,707 | B2 | 6/2005 | Hobgood et al. |
| 6,903,752 | B2 | 6/2005 | Ebersole et al. |
| 6,961,070 | B1 | 11/2005 | Madison et al. |
| 6,989,831 | B2 | 1/2006 | Ebersole et al. |
| 7,034,779 | B2 | 4/2006 | Ebersole, Jr. |
| 7,035,897 | B1 | 4/2006 | Devereaux et al. |
| 7,042,421 | B2 | 5/2006 | Hobgood et al. |
| 7,046,214 | B2 | 5/2006 | Ebersole, Jr. et al. |
| 7,057,582 | B2 | 6/2006 | Ebersole, Jr. et al. |
| 7,071,898 | B2 | 7/2006 | Hobgood et al. |
| 7,110,013 | B2 | 9/2006 | Ebersole et al. |
| 7,138,963 | B2 | 11/2006 | Hobgood et al. |
| 7,174,031 | B2 | 2/2007 | Rhoads et al. |
| 7,262,747 | B2 | 8/2007 | Ebersole et al. |
| 7,333,135 | B2 | 2/2008 | Foote et al. |
| 7,372,451 | B2 | 5/2008 | Dempski |
| 7,395,181 | B2 | 7/2008 | Foxlink |
| 7,538,724 | B1 | 5/2009 | Baillot |
| 7,576,727 | B2 | 8/2009 | Bell |
| 7,628,074 | B2 | 12/2009 | Vannucci et al. |
| 8,045,419 | B1 | 10/2011 | Johnson |
| 2002/0008153 | A1 | 1/2002 | Ebersole, Jr. et al. |
| 2002/0039085 | A1 | 4/2002 | Ebersole et al. |
| 2002/0147544 | A1 | 10/2002 | Nicosia et al. |
| 2002/0149581 | A1 | 10/2002 | Furlong et al. |
| 2002/0191003 | A1 | 12/2002 | Hobgood et al. |
| 2002/0191004 | A1 | 12/2002 | Ebersole et al. |
| 2002/0196202 | A1 | 12/2002 | Bastian et al. |
| 2002/0197591 | A1 | 12/2002 | Ebersole et al. |
| 2003/0003430 | A1 | 1/2003 | Ebersole et al. |
| 2003/0006045 | A1 | 1/2003 | Ebersole, Jr. et al. |
| 2003/0014212 | A1 | 1/2003 | Ralston et al. |
| 2003/0017438 | A1 | 1/2003 | Ebersole et al. |
| 2003/0025714 | A1 | 2/2003 | Ebersole et al. |
| 2003/0117342 | A1 | 6/2003 | Ebersole, Jr. et al. |
| 2003/0132283 | A1 | 7/2003 | Hobgood et al. |
| 2003/0210228 | A1 | 11/2003 | Ebersole et al. |
| 2004/0075605 | A1 | 4/2004 | Bradford et al. |
| 2004/0100402 | A1 | 5/2004 | McCandless |
| 2004/0130504 | A1 | 7/2004 | Ebersole, Jr. |
| 2004/0212630 | A1 | 10/2004 | Hobgood et al. |
| 2005/0121031 | A1 | 6/2005 | Ebersole |
| 2005/0168403 | A1 | 8/2005 | Ebersole, Jr. et al. |
| 2005/0195279 | A1 | 9/2005 | Hobgood et al. |
| 2005/0275664 | A1 | 12/2005 | Hobgood et al. |
| 2006/0009235 | A1 | 1/2006 | Sheynblat et al. |
| 2006/0227998 | A1 | 10/2006 | Hobgood et al. |
| 2006/0232499 | A1 | 10/2006 | Ebersole et al. |
| 2007/0132785 | A1 | 6/2007 | Ebersole, Jr. et al. |
| 2008/0033604 | A1 | 2/2008 | Margolin |
| 2009/0079964 | A1 | 3/2009 | Xu |
| 2010/0002077 | A1* | 1/2010 | Viggiano ............. G01S 13/867 348/115 |
| 2010/0002909 | A1 | 1/2010 | Lefevre et al. |

FOREIGN PATENT DOCUMENTS

| | | |
|---|---|---|
| JP | 2004526166 A | 8/2004 |
| JP | 2005517190 A | 6/2005 |
| JP | 2006048484 A | 2/2006 |
| JP | 2008064673 A | 3/2008 |
| JP | 2008157761 A | 7/2008 |
| JP | 2009008674 A | 1/2009 |
| JP | 2010040037 A | 2/2010 |
| JP | 2011512511 A | 4/2011 |
| WO | 03/015057 A | 2/2003 |
| WO | 03/060830 A | 7/2003 |
| WO | 2007/133209 A1 | 11/2007 |
| WO | 2009128859 A | 10/2009 |

OTHER PUBLICATIONS

Schmidt, G.S., et al. "Multidimensional Visual Representations for Underwater Environmental Uncertainty" IEEE Sep./Oct. 2004 pp. 56-65. Whole document; esp. figures, section starting on p. 60 entitled "Target state estimation uncertainty".

PCT/US11/26298 International Search Report and Written Opinion mailed Nov. 9, 2011.

Feiner et al.; A Touring Machine: prototyping 3D Mobile Augmented Reality Systems for Exploring the Urban Environment: Proc ISWC '97 (Int. Symp. on Wearable Computing), Cambridge, MA, Oct. 13-14, 1997, pp. 74-81.

Neurmann et al.; Augmented Reality Tracking in Natural Environments; Computer Science Department Integrated Media Systems Center University of Southern California.

Lyons et al.; Guided by Voices: An Audio Augmented Reality System; College of Computing 801 Atlantic Drive Georgia Institute of Technology, pp. 1-24.

Weichert et al.; Collaborative Gaming in a Mobile Augmented Reality Environment; Dept. of Mobile Information Visualization Computer Graphics Center Fraunhoferstr 5, 64283 Darnstadt, Germany.

Insley; Augmented Reality: Merging the Virtual and the Real; Nov. 9, 2003 ECE 399H Oregon State University.

Broll; Meeting Technology Challenges of Pervasive Augmented Reality Games; College of Computing, Georgia Institute of Technology, {kent, maribeth, thad} @cc.gatech.edu.

Behzadar; Structure of an Extensible Augmented Reality Framework for Visualization of Simulated Construction Processes; Proceedings of the 2006 Winter Simulation Conference, Ann Arbor, MI. pp. 2055-2062.

Gabbard et al.; Usability Engineering Domain Analysis Activiites for Augmented Reality Systems; Proceedings SPIE vol. 4660, p. 445-457, Sterescopic Displays and Virtual Reality.

Non Final Office Action Mailed Mar. 4, 2013, in U.S. Appl. No. 12/719,797, Henry Leung, filed Mar. 8, 2010.

Hollerer; Steps Toward Accommodating Variable Position Tracking Accuracy in a Mobile Augmented Reality System; AIMS '01: Second Int. Workshop on Artificial Intelligence in Mobile Systems, Seattle WA, Aug. 4, 2001, pp. 31-37.

Julier et al.; BARS Battlefield Augmented Reality System, Advanced Information Technology (Code 5580), pp. 1-7.

Azuma, R., et al., "Recent Advances in Augmented Reality," IEEE Computer Graphics and Application, vol. 21, No. 6, pp. 34-47, Nov. 2001.

Tan, D.K.P., et al., "Feasibility analysis of GSM signal for passive radar," on Proceedings of 2003 IEEE Radar Conference, May 2003, pp. 425-430.

Griffiths, H.D., and Baker, C.J., "Passive coherent location radar systems. Part 1: performance prediction," IEEE Proceedings Radar, Sonar and Navigation, Jun. 2005, pp. 153-159, vol. 152, No. 3.

Notice of Allowance mailed Jul. 29, 2013, in U.S. Appl. No. 12/719,797, Henry Leung, filed Mar. 8, 2010.

International Preliminary Report on Patentability, issued Sep. 11, 2012.

F. Ellinger et. al., "Local Positioning for Wireless Sensor Networks", IEEE GLOBECOM, Nov. 26-30, 2007.

Wagner et al., "Making Augmented Reality Practical on Mobile Phones, Part 1," Projects in VR, May-Jun. 2009.

* cited by examiner

BROADBAND PASSIVE TRACKING FOR AUGMENTED REALITY

CROSS-REFERENCE TO RELATED APPLICATION

This application is a Continuation under 35 U.S.C. §120 of U.S. patent application Ser. No. 12/719,797 filed on Mar. 8, 2010, now U.S. Pat. No. 8,610,771 issued on Dec. 17, 2013. The entire disclosure of the parent application is hereby incorporated by reference for all purposes.

BACKGROUND

Unless otherwise indicated herein, the materials described in this section are not prior art to the claims in this application and are not admitted to be prior art by inclusion in this section.

Augmented reality (AR) refers to a view of a physical (real) world environment whose elements are augmented by virtual, typically computer-generated, imagery, thereby creating a mixed reality. The augmentation may be conventionally in real time and in context with environmental elements, such a sporting event, a military exercise, a game, etc. AR technology enables the information about surrounding real world of a person to become interactive and digitally usable by adding object recognition and image generation. Artificial information about the environment and the objects may be stored and retrieved as an information layer separate from a real world view layer.

The present disclosure appreciates that there are several limitations with AR systems. In supplementing the real world with virtual or computer-generated objects that appear to coexist in the same space as the real world, AR technology allows a user to work with and examine real three dimensional (3D) objects while visually receiving additional computer-based information about those objects or the task at hand. In order to enable users to interact with a mixed virtual and real world in a natural way, an AR system may require knowledge of the user's location and the position of other objects of interest in the environment through environment sensing. For example, AR systems may need a depth map of the real scene to support occlusion when rendering. The system may also utilize information regarding the object's position and motion parameters, i.e., velocity, acceleration, motion direction, motion pattern, etc. However, various challenges remain with the AR systems in obtaining and processing position and motion parameters.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to a broadband passive tracking system for augmented reality applications.

Briefly stated, a broadband passive sensing and tracking system according to some embodiments may include a number of passive receivers that each have the capability of sensing electromagnetic waves (e.g. Radio Frequency "RF" signals) from surrounding broadcast sources. Each passive receiver may be adapted to sense through one or more antennas. Multiple receivers at different positions may be utilized to form a broadband sensing network adapted to perform collaborative tracking of a scene of interest. According to some examples, a beam-forming algorithm may be applied over the broadband sensing network utilizing an antenna array formed by the passive receivers to localize and track objects.

Figure 1:
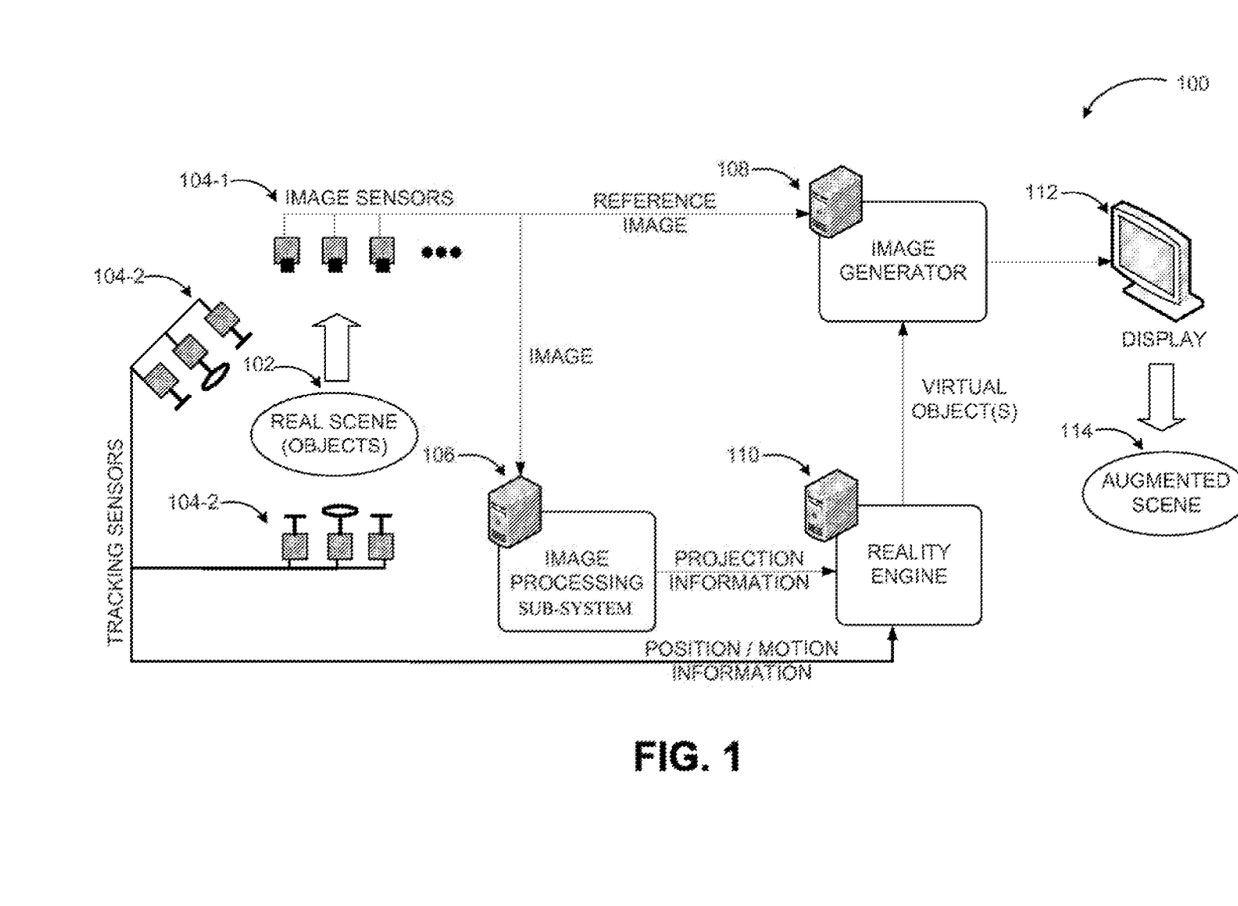
FIG. 1 illustrates an example Augmented Reality (AR) system, where some embodiments may be implemented.

FIG. 1 illustrates an example Augmented Reality (AR) system 100, arranged in accordance with at least some embodiments described herein. AR explores the application of computer-generated imagery in live video streams to expand the real world presentation. Example AR systems arranged in accordance with the present disclosure may be in controlled environments containing a number of sensors and actuators, may include one or more computing device adapted to process real and computer-generated imagery, and may include visualization systems such as head-mounted displays, virtual retinal displays, monitor or similar regular displays, and comparable devices.

Example AR system 100 includes image sensors 104-1 for capturing live images of real scene (objects) 102, as well as tracking sensors 104-2 for tracking a position and/or a motion of the objects. Image sensors 104-1 may be digital cameras, webcams, or some other image capturing devices. Tracking sensors 104-2 may include a number of receiving devices arranged in a passive sensing network to enhance tracking performance through frequency, bandwidth, and spatial diversity of the network. The receiving devices (e.g., one or more RF receivers) may be adapted to utilize communication signals (e.g., electromagnetic waves such as RF signals) from nearby signal sources such as communication towers (e.g., cellular telephony communication towers) or communication base stations. Tracking sensors 104-2 may be located in different positions and may be communicatively coupled to a centralized or distributed computing system form the collaborative network.

The captured image(s) may be provided to an image processing sub-system 106, which may be adapted to perform one or more of digitization of images into digital images, receipt of digital images, and/or processing digital images. Processing of digital images may include one or more of determining locations of feature points in the images, computation of affine projections, tracking of edges, filtering, and/or similar operations. Image processing sub-system 106 may be configured to provide projection information, such as one or more of the results of the above described operations, to reality engine 110. Tracking sensors 104-2 may be configured to provide position and/or motion information associated with objects of interest in real scene 102 to reality engine 110. Reality engine 110 may be adapted to execute a graphics process to render scenes based on the captured images that incorporates position and/or motion information from tracking sensors 104-2. Virtual objects may be rendered using the tracking information as discussed in more detail below.

Image generator 108 may be adapted to receive reference image(s) from image sensors 104-1 as well as image data associated with virtual object(s), and may be adapted to overlay the captured real scene images with the image data associated with the virtual object(s) to provide an augmented scene 114. Display 112 is one example visualization mechanism that may be utilized in AR system 100. As discussed previously, other types of display devices may be used to provide visualization of the augmented scene 114 for a user of AR system 100.

Image processing sub-system 106, reality engine 110, and image generator 108 may be implemented as separate applications, one or more integrated applications, one or more centralized services, or one or more distributed services on one more computing devices. Each computing device may be either a general purpose computing devices or a special purpose computing device that may be a standalone computer, a networked computer system, a general purpose processing unit (e.g., a micro-processor, a micro-controller, a digital signal processor or DSP, etc.), or a special purpose processing unit. If executed on different computing devices, various components of the AR system 100 may be adapted to communicate over one or more networks.

The network(s) may comprise any topology employing servers, clients, switches, routers, modems, Internet service providers (ISPs), and any appropriate communication media (e.g., wired or wireless communications). A system according to some embodiments may have a static or dynamic network topology. The network(s) may include a secure network such as an enterprise network (e.g., a LAN, WAN, or WLAN), an unsecure network such as a wireless open network (e.g., IEEE 802.11 wireless networks), or a world-wide network such (e.g., the Internet). The network(s) may also comprise a plurality of distinct networks that are adapted to operate together. The network(s) are adapted to provide communication between the nodes described herein. By way of example, and not limitation, the network(s) may include wireless media such as acoustic, RF, infrared and other wireless media.

Figure 2:
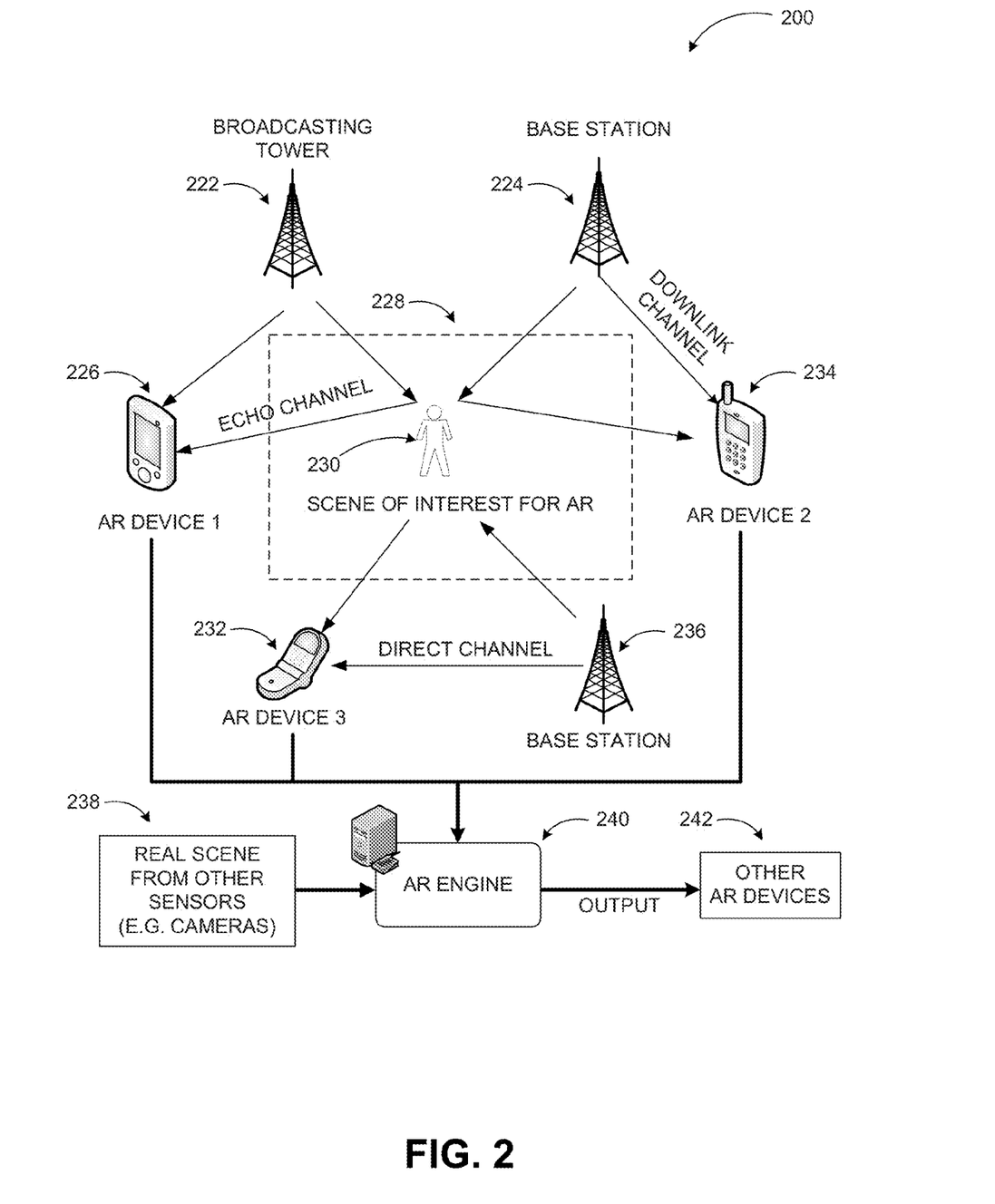
FIG. 2 illustrates an example broadband passive tracking system architecture that may provide input to an AR system.

FIG. 2 illustrates an example broadband passive tracking system architecture 200 that may provide input to an AR system. The enhancement in AR technology may include virtual geometric objects superimposed into the environment or a display of non-geometric information about existing real objects. Accurate registration is based on accurate tracking of the location of a user 230 and sensing other objects in a scene of interest 228. An AR system according to at least some embodiments utilizes passive sensing and tracking through Radio Frequency (RF) signals. Passive sensing employs existing illumination sources from nearby transmission sources (e.g. broadcasting tower 222 or base stations 224 and 236) and analyzes received signals scattered from the objects through passive receivers.

Some transmission sources may include, but are not limited to cellular communication sources, or radio frequency (RF) communication sources such as may be used for audio, television or some other data communication source Some examples sources may include TV broadcast towers, Global System for Mobile communications (GSM) towers, Code Division Multiple Access (CDMA) cellular communication towers, Time Division Multiple Access (TDMA) communication towers, or Orthogonal Frequency-Division Multiple Access (OFDMA) communication towers, Amplitude Modulation (AM) or Frequency Modulation (FM) broadcast towers, Digital Audio Broadcasting (DAB) sources, Digital Video Broadcasting-Terrestrial (DVB-T) sources, Wireless Local Area Network (WLAN) access points, Wide Area Network (WAN) access points. Metropolitan Area Network (MAN) access points, Personal Area Network (PAN) access points, and comparable ones. Similarly, example AR devices may include, but are not limited to a TV receiver, a digital TV receiver, a GSM device, a CDMA device, an AM/FM receiver, a DAB device, a DVB-T device, a WLAN device, a WAN device, a MAN device, and a PAN device, and comparable ones.

The term "broadband", as used herein, may refer to a wide range of frequencies that can be utilized by receivers of an AR sensing and tracking system according to some embodiments described herein. As such, the term may be distinguished from broadband Internet systems or similar technologies.

Passive receivers in a broadband network may be a collection of one or more homogenous sensors that are configured to receive energy from the same type of illumination source, or heterogeneous sensors that receive energy from different types of illumination sources. Passive receivers may be designed and integrated in AR enabled devices such as handheld devices or head-worn devices (e.g. AR devices 226, 232, and 234). Passive receivers may be adapted to communicate with one or more computing devices through a separate network (e.g. a local area network) to collaboratively carry out passive tracking of the scene of interest 228.

Each node in the network, corresponding to a passive receiver, may be adapted to passively receive, capture and/or evaluate signals in the RF signal spectrum of interest in the environment through either downlink communication channels from nearby base stations or downlink transmission channels from surrounding broadcasting sources (e.g. broadcasting tower 222 or base stations 224 and 236). The relative motion between objects and a node in the network can be observed as a variation of the Doppler spectrum of the environment. The motion parameters may be estimated by synthesizing an arbitrary antenna array formed by multiple antennas through the network of receivers. A point-to-point communication layer of the receiver network may be developed to enable communication and sharing of information between any two nodes in the receiver network.

The antenna array may be calibrated adaptively via a location service such as Global Positioning System (GPS) embedded in each passive receiver by providing accurate, continuous, and/or 3D position information. This information may also be used for compensating for the phase differences between passive receivers due to different locations relative to the moving objects as explained in conjunction with FIG. 4 below. By updating and sharing the sensing signals over the receiver network and the knowledge of the positions of stationary transmission sources utilized in the receiver network, a beam forming process may be performed on the synthesized antenna array to obtain the estimates of motion parameters and tracking. The beam forming algorithm may be designed to adapt to various sensing environments by selecting proper nodes in the receiver network and forming an optimal synthesized array according to the location of receivers.

Each passive receiver may be adapted to operate with two channels, which may be denoted as the direct channel and the echo channel. Direct channel signals can correspond to those signals received by the passive receiver as a result of direct emissions from the surrounding base stations or broadcasting towers, while scattered signals from moving objects can be fed into the echo channel of the passive receiver. The signals may be processed at the receivers and/or at a tracking module, and the resulting tracking information can be provided to AR engine 240 for further processing with captured images (video or still) from imaging sensors (238). The AR engine may be configured to output data associated with virtual objects or augmented scenes to other AR devices 242 for visualization or further AR related processing. The output data may also be transmitted back to AR devices 226, 232, 234 for visualization.

Figure 3A:
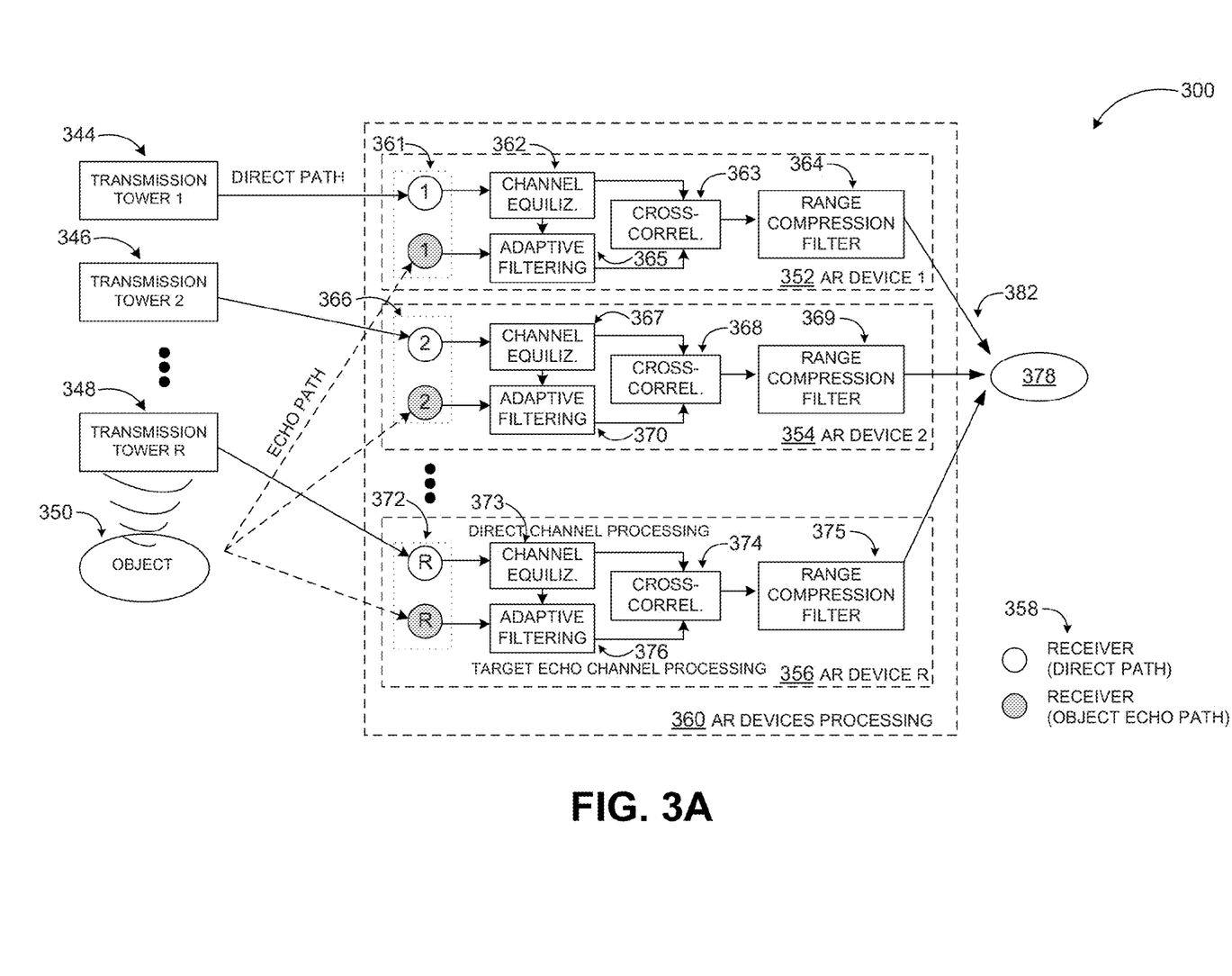
FIG. 3A illustrates a block diagram of example tracking processes by example AR devices using various transmission sources.

FIG. 3A illustrates a block diagram 300 of example tracking processes by example AR devices 352, 354, 356 using various transmission sources 344, 346, 348, arranged in accordance with at least some embodiments described herein. As mentioned previously, each passive receiver 361, 366, and 372 in a system according to some embodiments may be configured to receive signals over two channels, where one channel corresponds to a direct path and the other channel corresponds to an echo path (358). The direct path is located between transmission sources (e.g. transmission towers 344, 346, and 348) and the corresponding AR devices (352, 354, and 356) that incorporate the receivers 361, 366, and 372. The echo path indicates a communication path for data or other information concerning the scattered signal from the object of interest 350 to the AR devices 352, 354, and 356.

Received signals may be pre-processed at one or more of the individual AR devices 352, 354, and/or 356. The analog pre-processing may include one or more of signal correction (e.g. orthogonal signal correction, multiplicative signal correction, etc.), bandwidth filtering (e.g., passive or active filters such as band-pass, low-pass, high-pass, etc.), signal averaging, and comparable processes that may be performed on the direct channel and echo channel as shown by the AR device processing box 360 in block diagram 300. In particular, the received signals from both channels may be amplified or attenuated (e.g., gain scaling), down-converted (e.g. de-modulated), and digitized (e.g., quantized by a comparator or an analog-to-digital converter). To mitigate multipath interference, blind channel equalization may be performed on the direct signal (channel equalization 362, 367, and 373). An adaptive filtering algorithm may be applied (adaptive filtering 365, 370, 376) on both channels after digitization to suppress clutter and to remove the direct signal from the echo channel.

Doppler spectrum for the received signals may be obtained by performing a coherent cross-correlation (363, 368, and 374) between signals from the direct channel (i.e., a direct channel signal) and the echo channel (i.e., an echo channel signal). Range compression may be performed on the cross-correlated baseband signals in range compression filters 364, 369, and 375 before the baseband signals are fed (378) through a beam forming process via the receiver network to obtain a parametric space. Tracking objects may be realized by computing the beam forming process output of the synthesized antenna array at each time instant at a single computing device or through a distributed process executed by multiple computing devices.

Figure 3B:
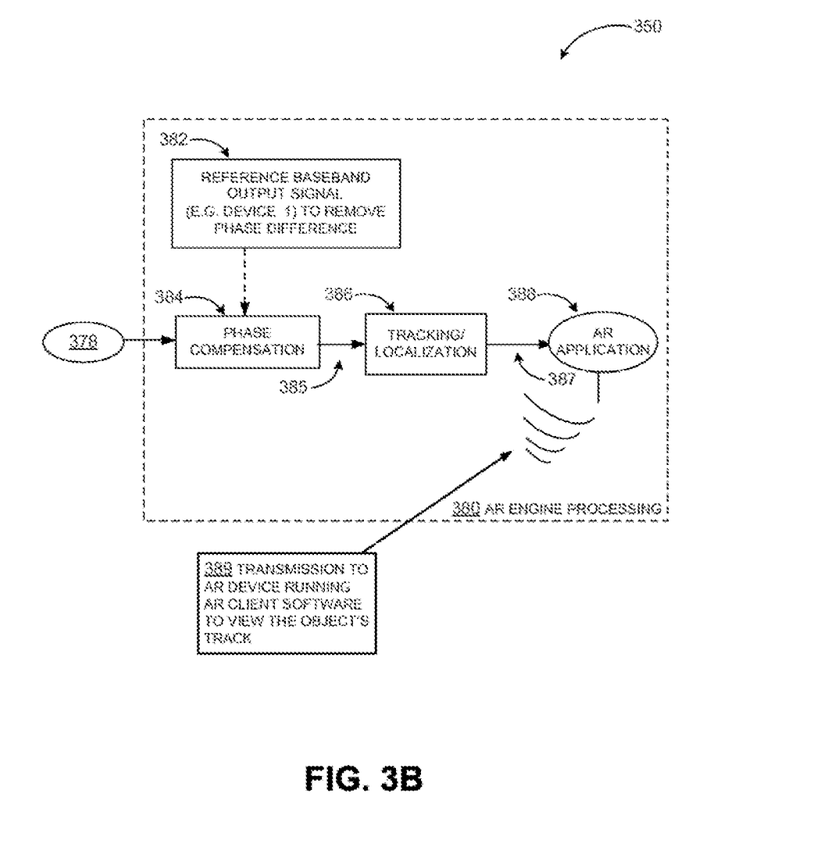
FIG. 3B illustrates a block diagram of tracking operations based on input to an example AR engine.

FIG. 3B illustrates a block diagram 350 of tracking operations based on input to an example AR engine, arranged in accordance with at least some embodiments described herein. As discussed above, the baseband signals may be fed (378) through a beam forming process in an AR engine processing block 380 as shown in diagram 350.

The baseband output signal 382 of one of the AR devices (e.g. AR device 352) may be used as a reference to remove phase difference. Phase difference may occur for scattering center due to different relative locations of sensor/transmitter pairs. Thus, one of the baseband output signals may be used as reference signal to remove the phase difference from the other baseband output signal for each AR device pair such that the signals are in rotational/angular/phase alignment with one another. After phase compensation 384 in frequency domain, the resulting signals may be equivalent to those obtained from the reference transmission tower but at different sensor locations. This enables target localization and tracking (386) to be performed by the AR engine processing module 380 using the phase compensated baseband output signals 385 from the AR devices (e.g., in pairs). The tracking/localization information 387 may then be provided to an AR application 388, which may also transmit the information to the AR device running the AR client software to enable user feedback, corrective processing, viewing the tracked object's motion, 389 and/or similar operations. Mathematical details of possible methods for domain conversion and phase conversation are discussed in detail below in conjunction with FIG. 4.

The diversity gain offered by a broadband passive network in a system according to some embodiments may produce performance gains for environment sensing and, thereby, may lead to improved tracking performance over single-receiver tracking. Diversity may be achieved in several aspects.

Frequency and bandwidth diversity result from the use of heterogeneous illumination sources. For example, GSM and DAB communication systems are operated at different frequencies with different bandwidths for transmission. Moreover, transmission towers and base stations in these systems may also have diverse antenna patterns. The objects illuminated by these sources generally yield different reflective properties, i.e., some objects are more visible to specific frequencies.

Spatial diversity can result from different locations of passive sensors or array elements with respect to the same objects. Likewise, signals used to identify the objects may have a better path to the object (either transmitted or reflected) from one source versus another. A beam forming algorithm according to at least some embodiments may be configured to adaptively select a number and location of tracking sensors in the network to increase the diversity gain to provide an enhanced tracking output. Furthermore, the performance gain may also be achieved from the synthesized antenna array by mitigating multipath fading and by cancelling interfering signals as a result of diversity.

In general, passive sensing employs existing communication links or broadcast systems, which may potentially reduce the size, weight, and power consumption of the passive devices to enable AR applications. In addition, as the illumination sources for communication and broadcast systems are ubiquitous, passive receivers are free of additional frequency allocation and relatively immune to interference from other RF devices compared to active receivers.

While embodiments have been discussed above using specific examples, components, algorithms, and configurations, they are intended to provide a general guideline to be used for broadband passive tracking in AR systems. These examples do not constitute a limitation on the embodiments, which may be implemented using other components, modules, algorithms, and configurations using the principles described herein. For example, other wireless technology systems may be utilized to detect scattered signals from objects of interest or a variety of signal processing methods may be employed to track objects based on the directly received and scattered signals.

Figure 4:
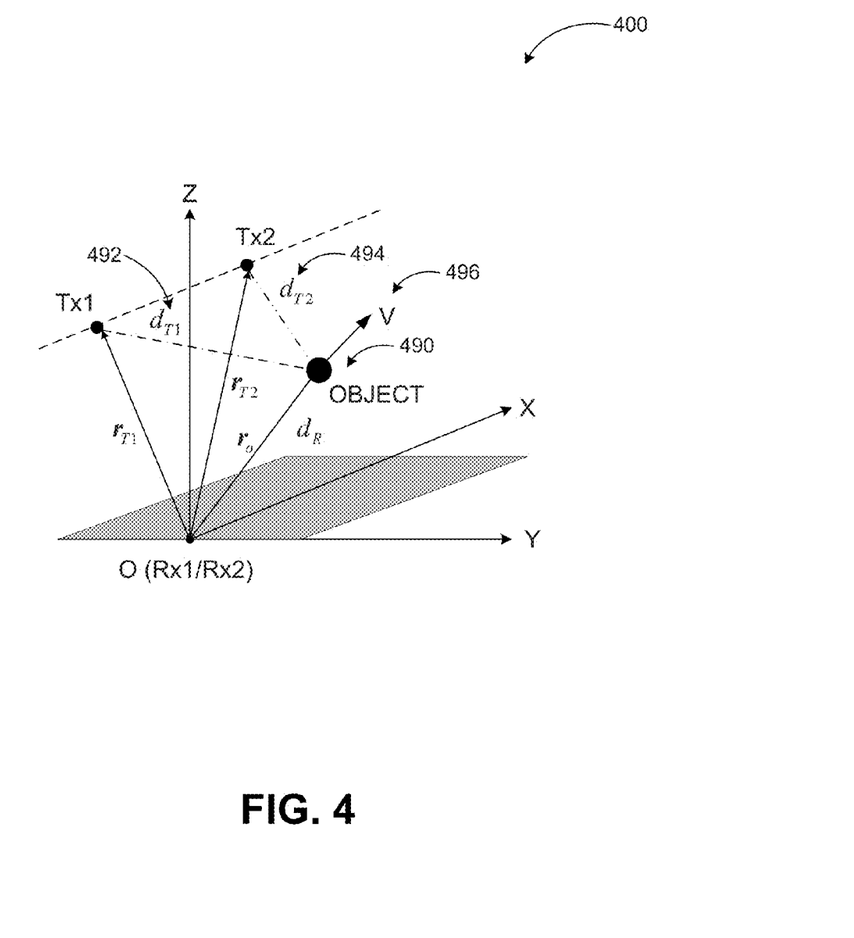
FIG. 4 illustrates geometric representation of a passive sensor network in a system according to embodiments.

FIG. 4 illustrates geometric representation 400 of a passive sensor network in a system arranged according to at least some embodiments described herein. For brevity and simplicity purposes, an object 490 with associated location vector $r_0$ is shown in geometric representation 400 with two transmission sources Tx1 and Tx2 at location vectors $r_{T1}$ and $r_{T2}$, respectively. Corresponding receivers Rx1 and Rx2 are located at the origin of the Cartesian coordinate system X, Y, Z. If a complex passive transmit signal denoted as:

$$s_T(t) = p(t)e^{(j2\pi f_c t)} \qquad [1]$$

is transmitted from either transmitter Tx1 or Tx2, the travel distance (492, 494) from each transmitter Txi (i=1, 2) to target scattering center may be expressed as:

$$d_{Ti} = |r_{Ti} - r_0|, \qquad [2]$$

where p(t) is the baseband signal and $f_c$ represents the carrier frequency.

The travel distance from receivers RXi (i=1, 2) to the target scattering center may be expressed as:

$$d_{xi} = |r_0|. \qquad [3]$$

Under the same scenario, the time delay of the ith channel signal may be expressed as:

$$\tau_i(r_0) = \frac{d_{Ti} - d_R}{c} = \frac{|r_{Ti} - r_0| - |r_0|}{c} (1 \leq i \leq 2), \qquad [4]$$

where c is the velocity of light. The received target echo channel signal from the ith transmission tower (e.g. Tx1), $S_{Ei}$(t, $r_0$) may be expressed as:

$$S_{Ei}(t, r_0) = \int_V g(r_0) p_i(t - \tau_i(r_0)) \exp(j2\pi f_{ci}(t - \tau_i(r_0))) dr_0, \qquad [5]$$

where (1≤i≤2). The direct channel return, $S_{Di}$(t), for the same scenario may be expressed as:

$$S_{Di}(t) = p_i(t - \tau_{di}) \exp(j2\pi f_{ci}(t - \tau_{di})), \qquad [6]$$

where $\tau_{di}$ is the direct path travel time, which is equivalent to $\tau_{di} = |r_{Ti}|/c$. $g(r_0)$ is the target reflectivity function. Integration may be taken over the entire spatial area of object scene of interest V (496).

After direct and target echo channel processing, the received signal may be rewritten as:

$$S_i(t, r_0) = \int_V g(r_0) p_i^c(t - \tau_i^c(r_0)) \exp(j2\pi f_{ci}(t - \tau_i^c(r_0))) dr_0, \qquad [7]$$

where $$\tau_i^c(r_0) = \tau_i(r_0) - \tau_{di} = \frac{|r_{Ti} - r_0| + |r_0| - |r_{Ti}|}{c} \qquad [8]$$

and $p_i^c$(t) is the compensated baseband signal for each transmitter (i=1, 2).

After baseband conversion and range compression, the received signals in frequency domain may be written as:

$$S_1(f) \approx rec(f/B_1) \int_V g(r_0) \exp(-j2\pi(f + f_{c1}) \tau_1^c(r_0)) dr_0, \text{ and} \qquad [9]$$

$$S_2(f) \approx rec(f/B_2) \int_V g(r_0) \exp(-j2\pi(f + f_{c2}) \tau_2^c(r_0)) dr_0, \qquad [10]$$

where $B_1$ and $B_2$ are bandwidths corresponding to transmission sources Tx1 and Tx2, respectively. Assuming the difference between center frequencies of the transmitters is $\Delta f_{21} = f_{c2} - f_{c1}$, the received signal for the second transmitter may be shifted in the frequency domain by $\Delta f_{21}$ and rewritten as:

$$S'_2(f) = S_2(f - \Delta f_{21}) = rec((f - \Delta f_{21})/B_2) \int_V g(r_0) \exp(-j2\pi(f + f_{c1}) \tau_2^c(r_0)) dr_0. \qquad [11]$$

A phase difference between the signals occurs for the scattering center due to the different relative location of sensor/transmitter pairs. Consequently, the phase difference for object 490 may be expressed as:

$$\Delta\phi(r_0) = -2\pi(f - f_{c1})\varepsilon(r_0), \qquad [12]$$

where $$\varepsilon(r_0) = \tau_2^c(r_0) - \tau_1^c(r_0) = \frac{(|r_{T2} - r_0| - |r_{T1} - r_0|) - (|r_{T2}| - |r_{T1}|)}{c}.$$

After compensating for the phase difference, $\Delta\phi(r_0)$, the two spectra may be equivalent to those obtained from the first transmission tower but at different sensor locations. To enable centralized target localization and tracking, the phase difference between any two sensor/transmitter pairs needs to be compensated. After phase compensation, the resulting signals may be equivalent to those obtained from the reference transmission tower but at different sensor locations.

Figure 5:
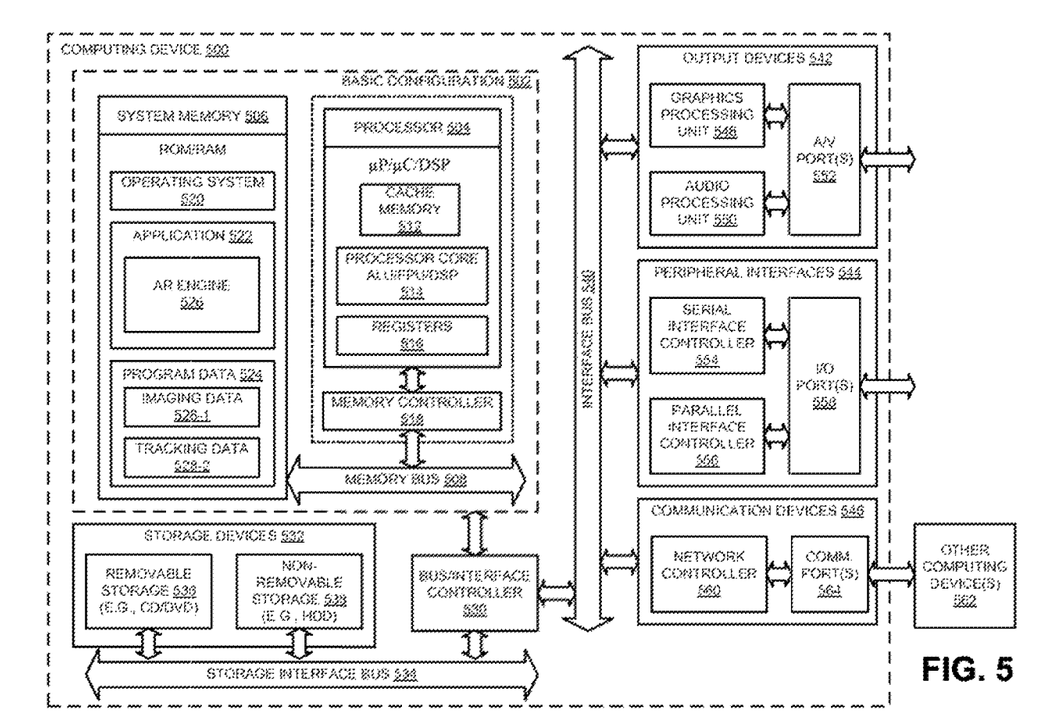
FIG. 5 illustrates a general purpose computing device, which may be used to implement broadband passive tracking in an AR system.

FIG. 5 illustrates a general purpose computing device 500, which may be used to implement broadband passive tracking in an AR system arranged according to at least some embodiments of the present disclosure. In a very basic configuration 502, computing device 500 typically includes one or more processors 504 and a system memory 506. A memory bus 508 may be used for communicating between processor 504 and system memory 506.

Depending on the desired configuration, processor 504 may be of any type including but not limited to a microprocessor (μP), a microcontroller (μC), a digital signal processor (DSP), or any combination thereof. Processor 504 may include one more levels of caching, such as a cache memory 512, a processor core 514, and registers 516. Example processor core 514 may include an arithmetic logic unit (ALU), a floating point unit (FPU), a digital signal processing core (DSP Core), or any combination thereof. An example memory controller 518 may also be used with processor 504, or in some implementations memory controller 518 may be an internal part of processor 504.

Depending on the desired configuration, system memory 506 may be of any type including but not limited to volatile memory (such as RAM), non-volatile memory (such as ROM, flash memory, etc.) or any combination thereof. System memory 506 may include an operating system 520, one or more applications 522, and program data 524. Application 522 may include an AR engine 526 that is arranged to adjust operational parameters of an object recognition and modeling system in conjunction with tracking information about the objects provided from a network of passive receivers as discussed above. Program data 524 may include one or more of imaging data 528-1, tracking data 528-2, and similar data as discussed above in conjunction with FIGS. 3A and 3B. This data may be useful in generating virtual objects to be augmented onto a real scene based on position and/or motion information associated with the objects in the real scene as is described herein. In some embodiments, application 522 may be arranged to operate with program data 524 on operating system 520 such that three dimensional objects are tracked and virtual representations generated as described herein. This described basic configuration 502 is illustrated in FIG. 5 by those components within the inner dashed line.

Computing device 500 may have additional features or functionality, and additional interfaces to facilitate communications between basic configuration 502 and any required devices and interfaces. For example, a bus/interface controller 530 may be used to facilitate communications between basic configuration 502 and one or more data storage devices 532 via a storage interface bus 534. Data storage devices 532 may be removable storage devices 536, non-removable storage devices 538, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 506, removable storage devices 536 and non-removable storage devices 538 are examples of computer storage media. Computer storage media includes, but is not limited to, RAM, ROM. EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 540 for facilitating communication from various interface devices (e.g., output devices 542, peripheral interfaces 544, and communication devices 546) to basic configuration 502 via bus/interface controller 530. Example output devices 542 include a graphics processing unit 548 and an audio processing unit 550, which may be configured to communicate to various external devices such as a display or speakers via one or more A/V ports 552. Example peripheral interfaces 544 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 may also be implemented as a personal computer including both laptop computer and non-laptop computer configurations. Moreover computing device 500 may be implemented as a networked system or as part of a general purpose or specialized server.

Example embodiments may also include methods. These methods can be implemented in any number of ways, including the structures described herein. One such way is by machine operations, of devices of the type described in the present disclosure. Another optional way is for one or more of the individual operations of the methods to be performed in conjunction with one or more human operators performing some of the operations while other operations are performed by machines. These human operators need not be collocated with each other, but each can be only with a machine that performs a portion of the program. In other examples, the human interaction can be automated such as by pre-selected criteria that are machine automated.

Figure 6:
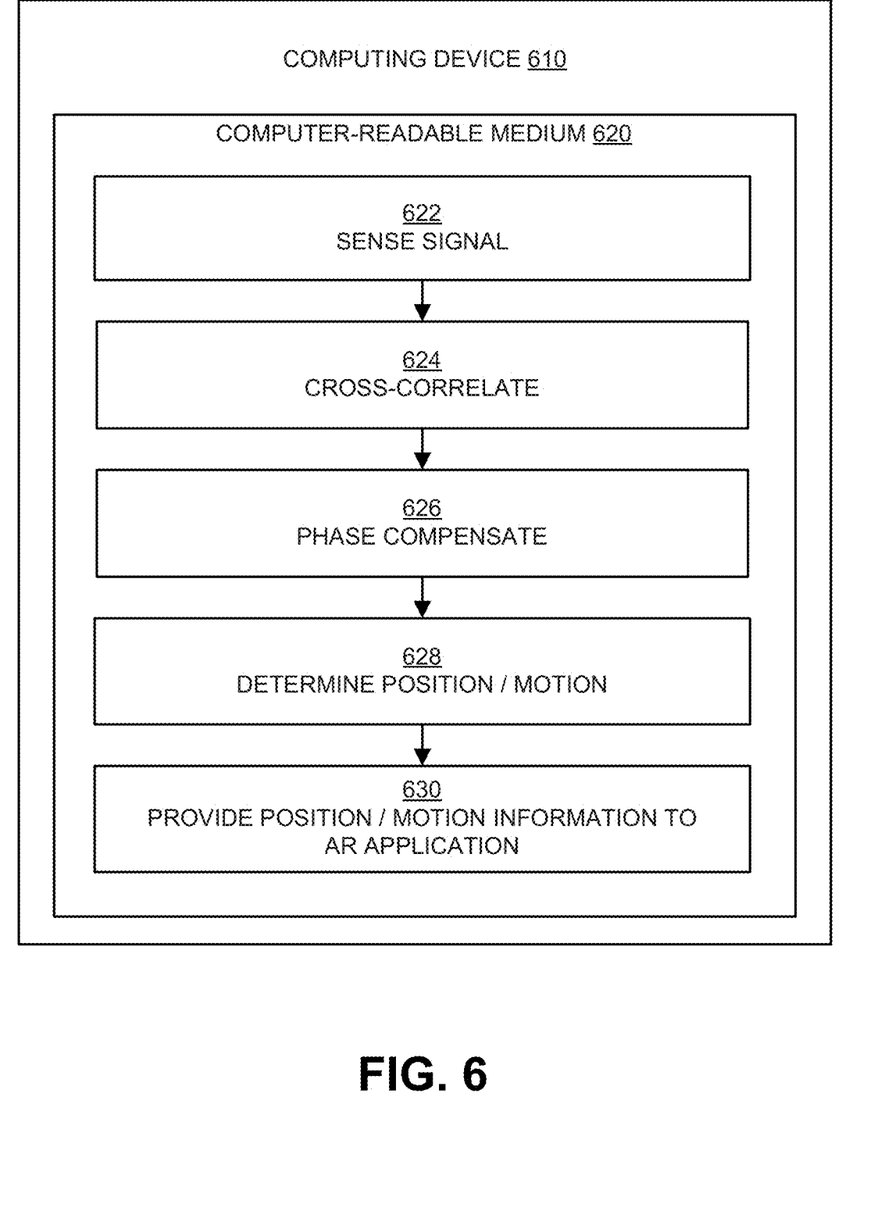
FIG. 6 is a flow diagram illustrating an example method that may be performed by a computing device such as device 500 in FIG. 5.

FIG. 6 is a flow diagram illustrating an example method that may be performed by a computing device, such as device 500 in FIG. 5, arranged in accordance with at least some embodiments described herein. The operations described in blocks 622 through 630 may be stored as computer-executable instructions in a computer-readable medium such as computer-readable medium 620 of computing device 610.

A process of employing a broadband passive tracking system for augmented reality may begin with operation 622, "SENSE SIGNAL". At operation 622, the direct and the echo signals are sensed by a network of receivers such as receivers 361 of FIG. 3A. The receivers may be integrated into wireless devices such as AR devices 352, 354, and 356. The direct signals may be received from a variety of transmission sources such as cellular towers, TV broadcast towers, and the like, while the echo signals are scattered from one or more objects of interest. The received signals may be pre-processed as discussed in conjunction with FIG. 3A.

Operation 622 may be followed by operation 624, "CROSS-CORRELATE." At operation 624, the received (and pre-processed) signals may be cross-correlated to obtain Doppler spectrum for the received signals. Cross-correlation may also be performed in the individual AR devices 352, 354, and 356 of FIG. 3A.

Operation 624 may be followed by operation 626, "PHASE COMPENSATE." At operation 626, the received signals may be phase compensated using the signal from one of the AR devices (e.g. baseband output signal 382 from AR device 352) at a central tracking/localization module such as tracking/localization module 386 of FIG. 3B. Phase difference may occur for scattering center due to different relative locations of sensor/transmitter pairs. Thus, one of the baseband output signals may be used as reference signal to remove the phase difference from the other baseband output signal for each AR device pair such that the signals are in rotational/angular/phase alignment with one another. After phase compensation 384 in frequency domain, the resulting signals 385 may be equivalent to those obtained from the reference transmission tower but at different sensor locations.

Operation 626 may be followed by operation 628, "DETERMINE POSITION/MOTION." At operation 628, the phase compensated signals may be fed through a beam forming process at an AR engine such as AR engine 240 of FIG. 2 via the receiver network to obtain a parametric space. Tracking (determining position and/or motion parameters) objects may be realized by computing the beam forming process output of the synthesized antenna array at each time instant.

Operation 628 may be followed by operation 630, "PROVIDE POSITION/MOTION INFORMATION TO AR APPLICATION." At operation 630, the tracking (position/motion) information may be provided to an AR application for use in rendering an augmented reality scene superimposing virtual objects with real scene image(s). The AR scene may be visualized through a visualization device such as those discussed in FIG. 1.

The operations included in the above described process are for illustration purposes. A broadband passive tracking system for obtaining position and/or motion information associated with objects in an AR system may be implemented by similar processes with fewer or additional operations. In some examples, the operations may be performed in a different order. In some other examples, various operations may be eliminated. In still other examples, various operations may be divided into additional operations, or combined together into fewer operations.

Figure 7:
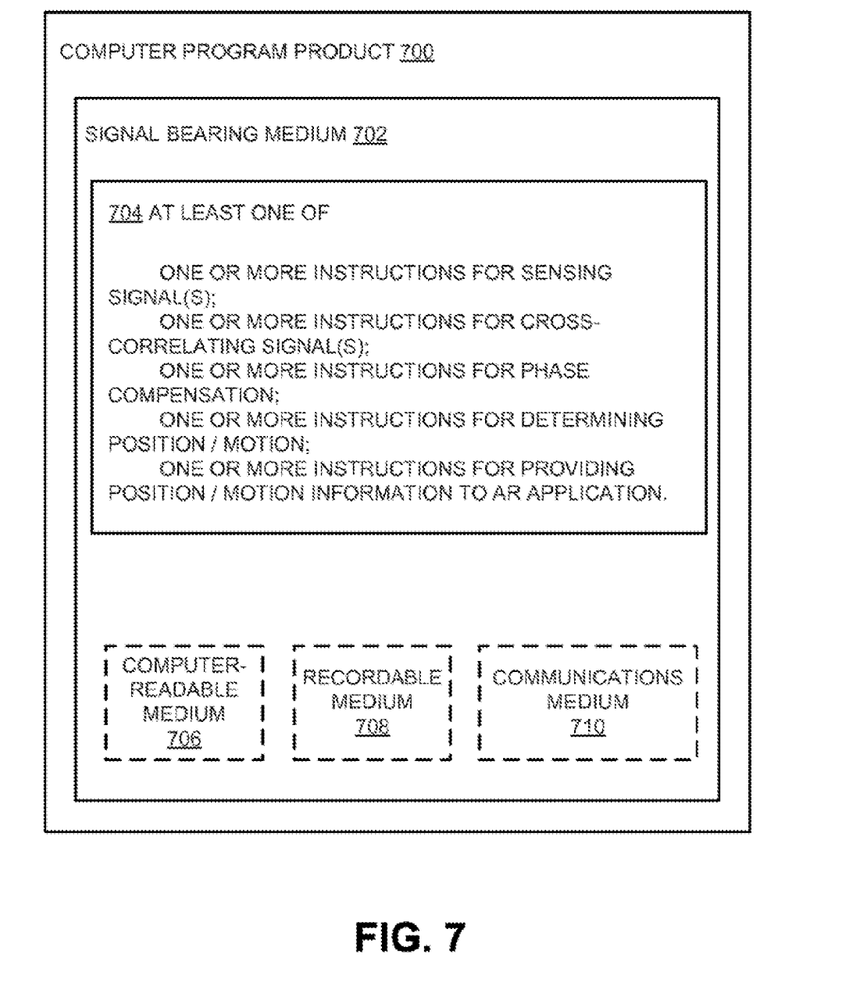
FIG. 7 illustrates a block diagram of an example computer program product, all arranged in accordance with at least some embodiments described herein.

FIG. 7 illustrates a block diagram of an example computer program product 700 arranged in accordance with at least some embodiments described herein. In some examples, as shown in FIG. 7, computer program product 700 may include a signal bearing medium 702 that may also include machine readable instructions 704 that, when executed by, for example, a processor, may provide the functionality described above with respect to FIG. 5 and FIG. 6. Thus, for example, referring to processor 504, the AR engine 526 may undertake one or more of the tasks shown in FIG. 7 in response to instructions 704 conveyed to processor 504 by signal bearing medium 702 to perform actions associated with object recognition based on dynamic modeling as described herein. Some of those instructions may include sensing signal(s), cross-correlating signal(s), determining range of object(s), determining position/motion information, and providing the position/motion information to an AR engine.

In some implementations, signal bearing medium 702 depicted in FIG. 7 may encompass a computer-readable medium 706, such as, but not limited to, a hard disk drive, a Compact Disc (CD), a Digital Video Disk (DVD), a digital tape, memory, etc. In some implementations, signal bearing medium 702 may encompass a recordable medium 708, such as, but not limited to, memory, read/write (R/W) CDs, R/W DVDs, etc. In some implementations, signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, computer program product 700 may be conveyed to one or more modules of the processor 504 by an RF signal bearing medium 702, where the signal bearing medium 702 is conveyed by a wireless communications medium 710 (e.g. a wireless communications medium conforming with the IEEE 802.11 standard).

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to track one or more objects of interest in an augmented reality (AR) system, the method comprising:
   receiving signals at each one of a plurality of tracking sensors, wherein:
      each of the plurality of tracking sensors form part of a passive broadband sensing network and utilize passive sensing to analyze the received signals,
      the received signals are scattered by the one or more objects of interest and received through passive receivers,
      the received signals correspond to one or more of a direct signal from an existing illumination source and/or an echo signal that is scattered by the one or more objects of interest as a result of the direct signal, and
      the existing illumination source is not part of the passive broadband sensing network;
   processing the received signals to generate data associated with the object of interest through one or more of determining a location of one or more feature points in an image, computation of affine projections, tracking of edges, and filtering, and wherein the data corresponds to one or more of a position parameter and/or a motion parameter associated with the object of interest;
   developing a point-to-point communication layer to enable communication and sharing of information between any two sensors in the passive broadband sensing network; and
   augmenting a real scene that includes the one or more objects of interest, by employing one or more of the position parameter and/or the motion parameter to augment the one or more objects of interest in the real scene with at least one virtual object.

2. The method according to claim 1, wherein processing the received signals includes one or more of:
   pre-processing the received signals;
   identifying each of the received signals as one or more of the direct signal and/or the echo signal through the filtering, which includes adaptive filtering;
   deriving Doppler spectra of the direct signal and the echo signal; and/or
   phase compensating the Doppler spectra of the echo signals.

3. The method according to claim 2, wherein pre-processing the received signals includes one or more of signal correction, bandwidth correction, signal averaging, amplification, down-conversion, and/or digitization.

4. The method according to claim 2, wherein processing the received signals to generate data associated with the object of interest comprises employing a beam forming process on the phase compensated signals to determine one or more of position and/or motion parameters associated with the object of interest.

5. The method according to claim 4, wherein employing the beam forming process comprises:
   adaptively selecting a number and a location of the tracking sensors, the tracking sensors integrated into a plurality of wireless communication devices communicating with a plurality of transmission sources.

6. The method according to claim 5, further comprising:
   dynamically configuring a wireless network of the tracking sensors to mitigate multipath fading and reduce interference through diversity of antennas of the wireless communication devices.

7. An apparatus to track one or more objects of interest in an augmented reality (AR) system, the apparatus comprising:
   a wireless communication device; and
   an antenna and a tracking sensor included in the wireless communication device, wherein the wireless communication device is adapted to:
      receive signals with the antenna, wherein:
         the tracking sensor is a part of a passive broadband sensing network and utilizes passive sensing to analyze the received signals,
         a point-to-point communication layer is developed to enable communication and sharing of information between the tracking sensor and another tracking sensor in the passive broadband sensing network,
         the received signals are scattered by the one or more objects of interest and received through passive receivers,
         the received signals correspond to one or more of direct signals from an existing illumination source or echo signals that are scattered from the one or more of the objects of interest as a result of one or more of the direct signals, and
         the existing illumination source is not part of the passive broadband sensing network;
      process the received signals to generate data corresponding to one or more of a position parameter and/or a motion parameter associated with the one or more objects of interest by:
         pre-process of the received signals to obtain one or more frequency domain signals;
         cross-correlation of each direct signal and each echo signal to generate a Doppler spectrum signal;
         performance of range compression on the cross-correlated signals in a range compression filter;
         feeding of the cross-correlated signals through a beam forming process to obtain a parametric space to derive location and motion information;
         phase compensation of the one or more frequency domain signals to generate phase compensated signals; and
         derivation of the location and motion information associated with one or more of the objects of interest from the phase compensated signals; and
      augment a real scene that includes the one or more objects of interest, by use of one or more of the position parameter and/or the motion parameter to augment the one or more objects of interest in the real scene with at least one virtual object.

8. The apparatus according to claim 7, wherein the wireless communication device is adapted to pre-process the received signals by application of one or more of signal correction, bandwidth correction, signal averaging, amplification, down-conversion, and/or digitization.

9. A method to process signals of one or more of objects of interest in an augmented reality (AR) system, the method comprising:

receiving signals with at least one of a plurality of tracking sensors, wherein:
- each of the plurality of tracking sensors form part of a broadband sensing network and utilize passive sensing to analyze the received signals,
- a point-to-point communication layer is developed to enable communication and sharing of information between the plurality of tracking sensors in the passive broadband sensing network,
- the received signals are scattered by the one or more objects of interest and received through passive receivers,
- the received signals correspond to one or more of direct signals from an existing illumination source or echo signals that are scattered by the one or more objects of interest as a result of the direct signals, and
- the existing illumination source is not part of the passive broadband sensing network;

applying a beam forming process to the received signals to estimate location and motion parameters for the object of interest; and augmenting a real scene that includes the one or more objects of interest, by use of one or more of the location and motion parameters to augment the one or more objects of interest in the real scene with at least one virtual object.

10. The method according to claim 9, wherein the beam forming process comprises selecting tracking sensors associated with one or more of transmission sources having distinct frequencies, transmission sources having distinct bandwidths, or transmission sources having distinct antenna patterns, so that diversity gain is increased.

11. The method according to claim 9, wherein the signals are received with tracking sensors that are communicatively coupled through a wireless network distinct from a communication network of corresponding wireless communication devices.

12. The method according to claim 11, further comprising dynamically configuring the wireless network of the tracking sensors to mitigate multipath fading and reduce interference through diversity of antennas of the wireless communication devices.

13. An apparatus to process signals of one or more of objects of interest in an augmented reality (AR) system, the apparatus comprising:

a memory having an AR engine stored herein;

a processor coupled to the memory, the processor configured in cooperation with the memory to execute the AR engine such that the processor is adapted to:
- identify signals received with at least one of a plurality of tracking sensors and which are received from an existing illumination source, wherein:
  - each of the plurality of tracking sensors form part of a passive broadband sensing network and utilize passive sensing to analyze the received signals,
  - a point-to-point communication layer is developed to enable communication and sharing of information between the plurality of tracking sensors in the passive broadband sensing network,
  - the received signals are scattered by the one or more objects of interest and received through passive receivers,
  - the received signals correspond to one or more of direct signals from the existing illumination source or echo signals that are scattered by the one or more objects of interest as a result of the direct signals, and
  - the existing illumination source is not part of the passive broadband sensing network; and
- apply a beam forming process to the received signals to estimate location and motion parameters for the object of interest; and
- augment a real scene that includes the one or more objects of interest, by use of one or more of the location and motion parameters to augment the one or more objects of interest in the real scene with at least one virtual object.

14. The apparatus according to claim 13, wherein the beam forming process comprises selecting tracking sensors associated with one or more of transmission sources having distinct frequencies, transmission sources having distinct bandwidths, or transmission sources having distinct antenna patterns, so that diversity gain is increased.

15. The apparatus according to claim 13, wherein the signals are received with tracking sensors that are communicatively coupled through a wireless network distinct from a communication network of corresponding wireless communication devices.

16. The apparatus according to claim 15, wherein the processor is further adapted to dynamically configure the wireless network of the tracking sensors to mitigate multipath fading and reduce interference through diversity of antennas of the wireless communication devices.

* * * * *